(No Model.)  4 Sheets—Sheet 1.

M. W. HALL.
STEAM ACTUATED VALVE FOR DUPLEX ENGINES.

No. 301,363.  Patented July 1, 1884.

WITNESSES:
Geo. H. Fraser.
E. B. Bolton.

INVENTOR:
Milan W. Hall
By his Attorneys.
Burke Fraser Bonnett (No Model.)

4 Sheets—Sheet 2.

M. W. HALL.
STEAM-ACTUATED VALVE FOR DUPLEX ENGINES.

No. 301,363. Patented July 1, 1884.

WITNESSES:
Geo. H. Fraser.
E. B. Bolton.

INVENTOR:
Milan W. Hall
By his Attorneys,
Bunker Fraser Bennett

N. PETERS. Photo-Lithographer. Washington, D. C.

(No Model.) M. W. HALL. 4 Sheets—Sheet 3.

STEAM ACTUATED VALVE FOR DUPLEX ENGINES.

No. 301,363. Patented July 1, 1884.

WITNESSES:
Geo. H. Fraser.
E. B. Bolton

INVENTOR:
Milan W. Hall
By his Attorneys,
Burke, Fraser & Connett (No Model.)
M. W. HALL.
4 Sheets—Sheet 4.
STEAM ACTUATED VALVE FOR DUPLEX ENGINES.
No. 301,363.  Patented July 1, 1884.
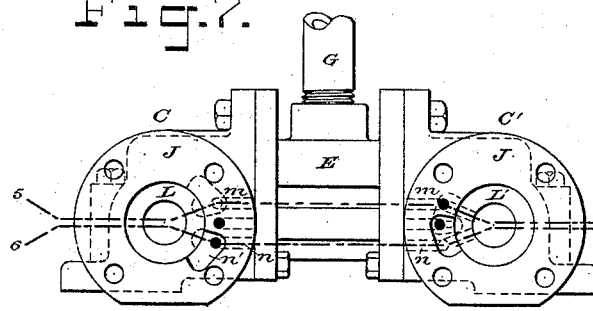
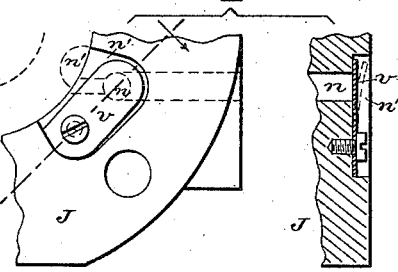
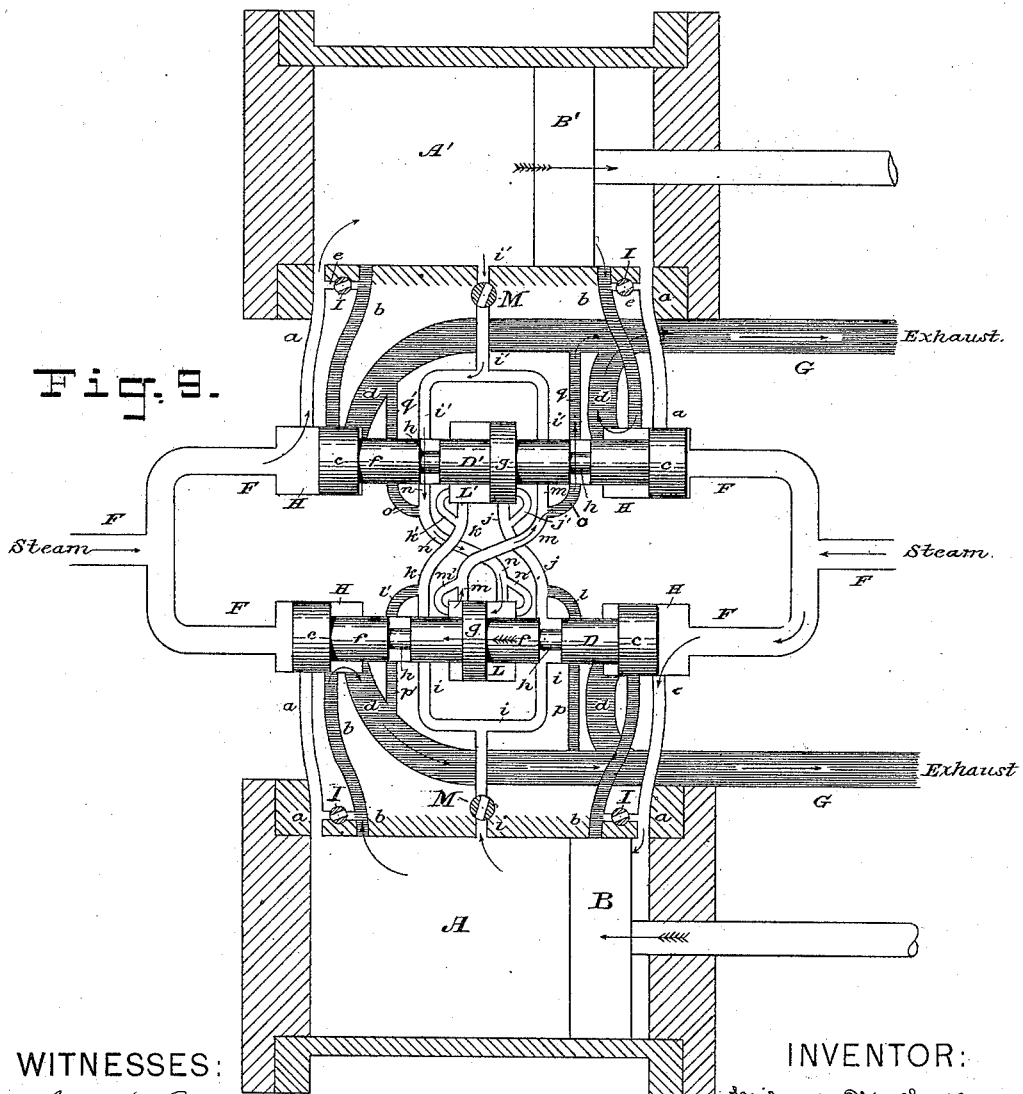
WITNESSES:
Geo. H. Fraser.
E. B. Bolton
INVENTOR:
Milan W. Hall
By his Attorneys,

UNITED STATES PATENT OFFICE.

MILAN W. HALL, OF BROOKLYN, NEW YORK.

STEAM-ACTUATED VALVE FOR DUPLEX ENGINES.

SPECIFICATION forming part of Letters Patent No. 301,363, dated July 1, 1884.

Application filed November 26, 1883. (No model.)

*To all whom it may concern:*

Be it known that I, MILAN W. HALL, a citizen of the United States, formerly of Plainfield, New Jersey, and now residing in Brooklyn, Kings county, New York, have invented certain Improvements in Steam - Actuated Valves for Duplex Engines, of which the following is a specification.

My invention relates to steam-engines having two cylinders and pistons, such as are used for working duplex steam-pumps or air-compressors; and its object is to provide means for actuating the valves by steam-pressure alone, without the intervention of moving parts, and for causing the two engines to reciprocally control each other through the medium of their valves. The valves are inclosed in tight valve-chests without stuffing-boxes, and communicate only with the steam-cylinders and with the exhaust through small steam-passages. They are provided with pistons, upon which the steam acts and shifts the valves longitudinally, the steam which moves the valve of one engine coming from the cylinder of the other engine. Adjustments are provided by which the pistons may be caused to pause at each end of their stroke, or to return immediately, as may be most desirable for the character of work being done.

In connection with the peculiar system of valve-actuating steam - passages, means are provided for cushioning both the valve-pistons and the cylinder-pistons, the cushioning of the latter being capable of adjustment with the utmost nicety.

The accompanying drawings show the preferred form and construction of my improved duplex engine.

Figure 1:
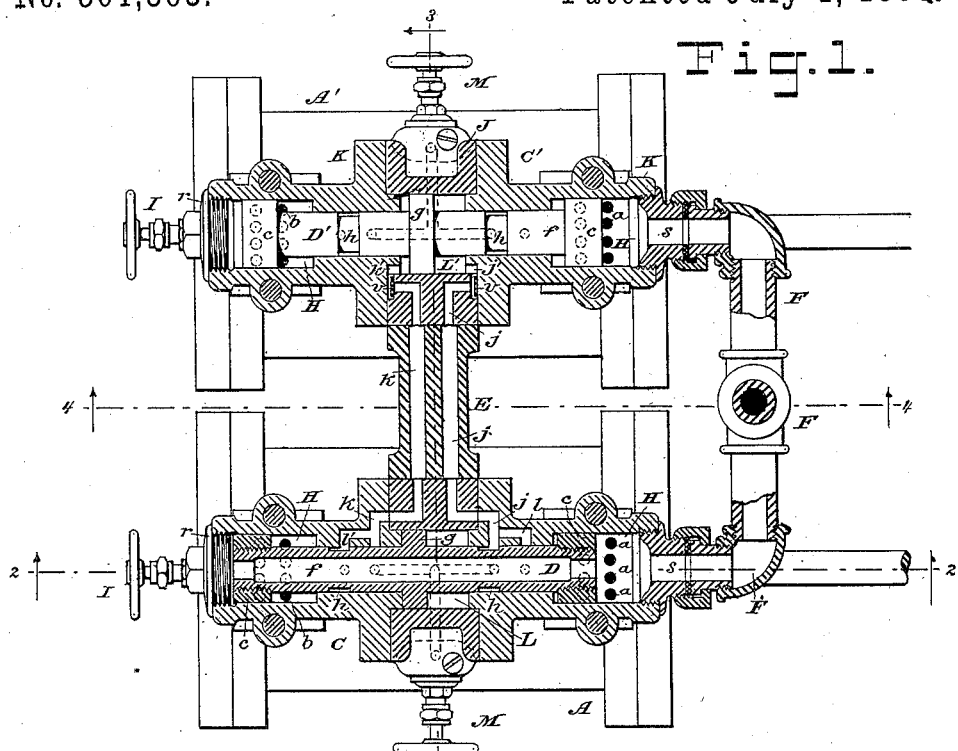
Figure 2:
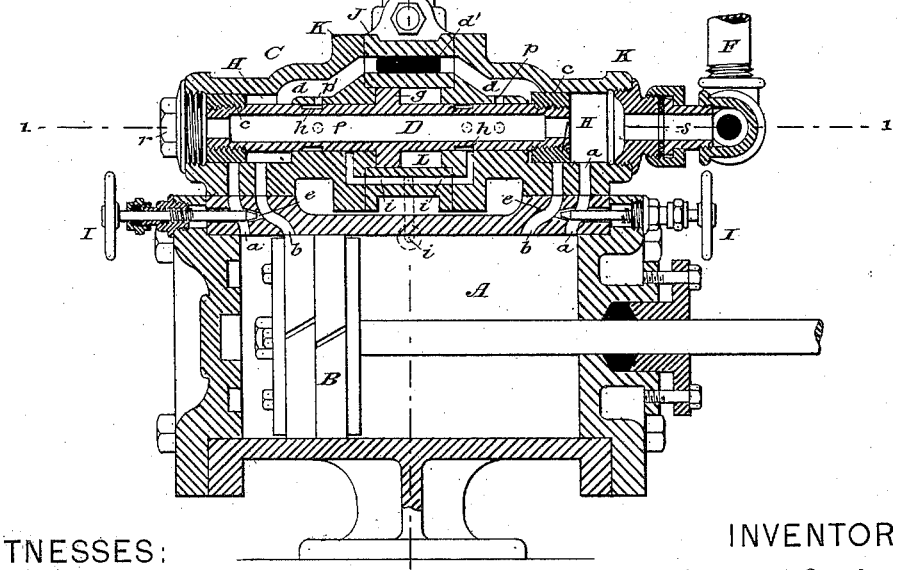
Figure 3:
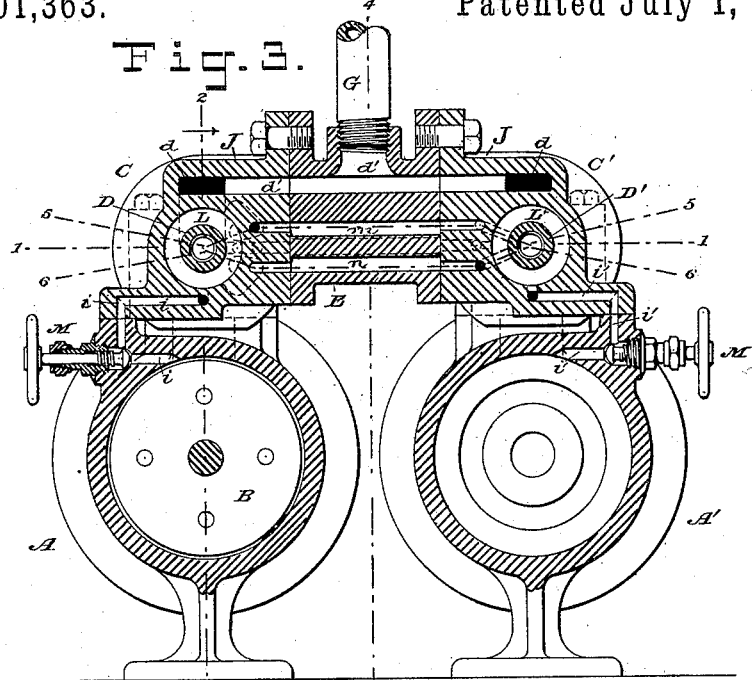
Figure 4:
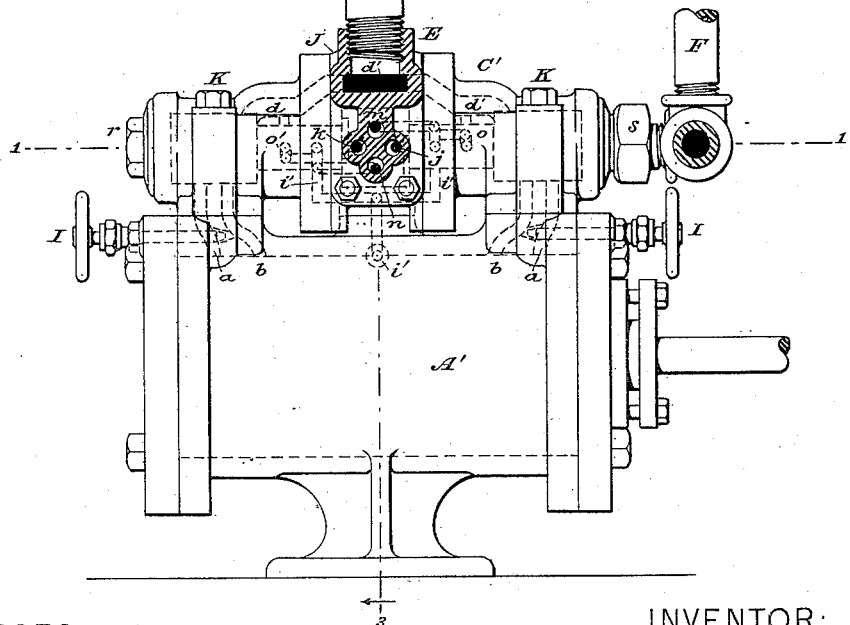
Figure 5:
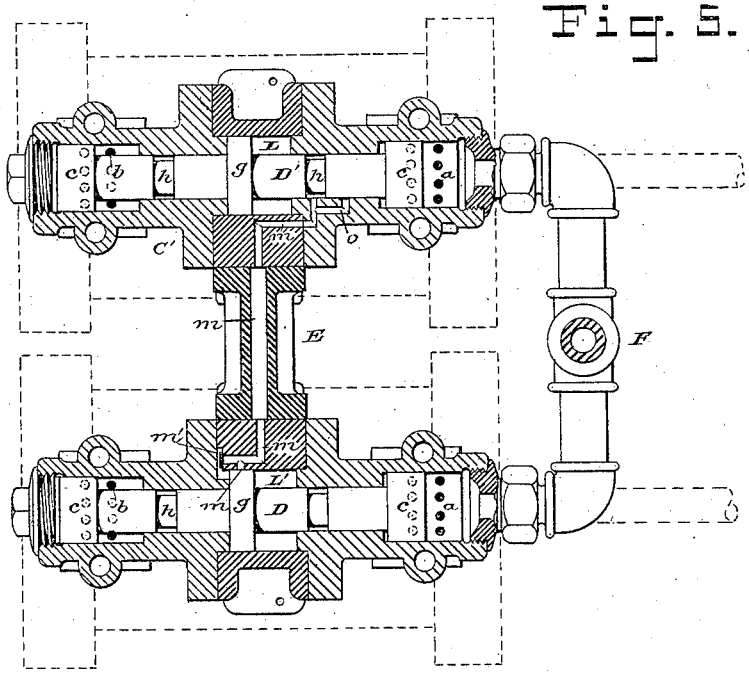
Figure 6:
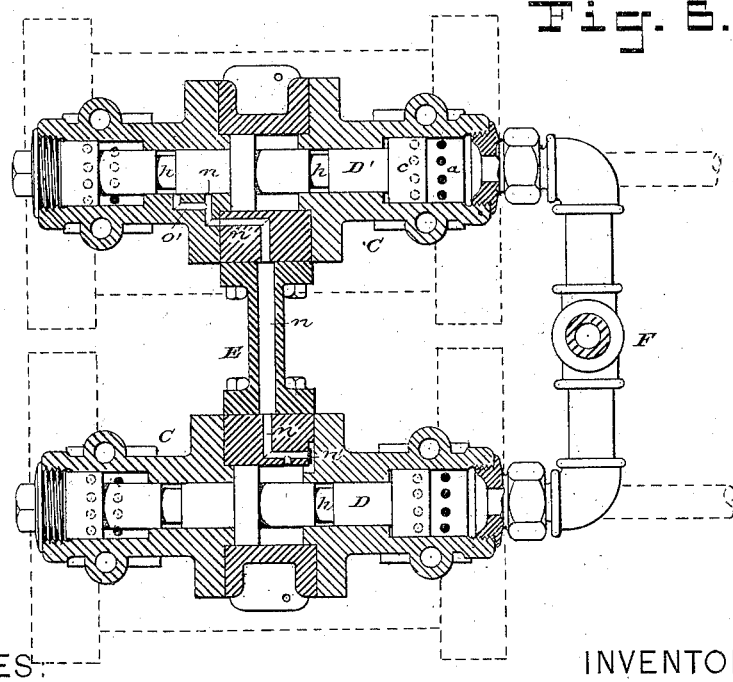

Figure 1 is a horizontal section through the axis of the valve-chests, showing the cylinders in plan, the section being cut along the line 1 1 in Figs. 2, 3, and 4. Fig. 2 is a vertical longitudinal mid-section through one engine and its valve, as denoted by lines 2 2 in Figs. 1, 3, and 4. Fig. 3 is a vertical transverse section through the middle of both engines, as indicated by the line 3 3 in Figs. 1, 2, and 4. Fig. 4 is a vertical longitudinal section cut midway between the two engines, as indicated by the lines 4 4 in Figs. 1 and 3, and showing one engine in side elevation. Fig. 5 is a horizontal section of the valve-chests, the plane of the section being elevated, as denoted by the dotted line 5 5 in Figs. 3 and 7, to show one of the steam-passages. Fig. 6 is a similar view, the plane of the section being depressed, as indicated by the dotted line 6 6 in Figs. 3 and 7, to show another steam-passage. Fig. 7 is an end elevation of the middle casting of the two valve-chests removed, with the bridge-piece between them. Fig. 8 is an enlarged detail view, comprising a fragmentary end view and section of one of said middle castings, showing one of the valve-piston-cushioning valves; and Fig. 9 is a diagram designed to illustrate the relations and operations of all the parts.

In this specification I use the word "engine" to signify one cylinder and piston and the valve-chest and valve thereof. The valve of each engine is actuated by steam taken from the cylinder of the other engine, so that each engine controls the movement of the valve of the other.

Let A A' designate the two cylinders, B B' their pistons, C C' the valve-chests, and D D' the valves. E is a bridge or cross piece extending between the two valve-chests at their middle. F is the steam-pipe, and G is the exhaust-pipe. The valve-chest of each engine is, by preference, mounted directly over the cylinder, with its axis parallel to the axis of the cylinder.

Referring to Fig. 2, it will be seen that the cylinder has four ports—two at each end. One of these ports (lettered $a$) is a steam-port, and the other (lettered $b$) is an exhaust-port. The steam-ports $a$ $a$ enter the extreme ends of the cylinder, and the exhaust-ports $b$ $b$ enter the cylinder a short distance from each end. Each pair of ports $a$ $b$ extends outward and communicates with a chamber, H, in the valve-chest C, each port opening into it in the form of a row of perforations. (Seen in Fig. 1.) The two chambers H are formed in the valve-chest C at its opposite ends, and into both live steam is admitted, it entering the one at the right directly from the steam-pipe E, and passing to the one at the left through the valve D, which is made tubular for this purpose. The valve is thus balanced by having equal pressures against its opposite ends. Each end of the valve D consists of a small thick piston, $c$, the two pistons $c\ c$ fitting their respective cylindrical chambers H H. The valve D is capable of a short longitudinal movement, and is so proportioned relatively to the chambers H H and ports $a\ b\ a\ b$ that when moved to the left, as shown in Fig. 2, the port $a$ at the right is uncovered, and the port $b$ at the left is uncovered, and when moved to the right these ports are covered, and the port $a$ at the left and the port $b$ at the right are uncovered. This arrangement makes the ports $a$ and $b$ very short and direct, which is a great practical advantage. The steam enters one end of each chamber H, and the exhaust leads from the opposite end, the piston $c$ intervening. An exhaust-passage, $d$, extends through the upper part of each valve-chest over the valve. Its ends communicate with the exhaust ends of the chambers H H, Fig. 2, and its middle communicates with a cross-passage, $d'$, in the upper part of the bridge-piece E, Fig. 3. The exhaust-pipe G taps the middle of this passage $d'$.

Each engine is operated thus: The valve D being at the left and the piston B at the right, steam passes from pipe F into the chamber H at the right, thence down the right-hand port $a$ into the cylinder A, where it forces the piston toward the left. The steam at the left of the piston escapes through the left-hand port $b$ into the right-hand end of the left-hand chamber H, passes thence into the exhaust-passage $d$, and thence through the passage $d'$ into the exhaust-pipe G. When the piston nears the left-hand end of the cylinder, it passes and closes the exhaust-port $b$, and cushions itself upon the confined steam in the end of the cylinder beyond the port. The steam cannot escape through the port $a$, because this port is covered by the piston $c$ of the valve D. The piston is thus easily and elastically stopped by the cushion, and when the valve is moved to the right steam is admitted to the left of the piston, and it is forced toward the right again. Thus, when the valve is moved to the left, the piston is forced toward the left, and when the valve is moved to the right the piston follows it and moves to the right. The piston is cushioned at each end of its stroke, and the steam-cushions are adjustable, so that the steam may be absolutely confined, (which is desirable when running rapidly with a light load,) or the confined cushion of steam may be allowed to rapidly escape, so that the cushioning shall be slight, (which is preferable when running slowly with a heavy load,) in order that the piston may move its full stroke before reversing. For this purpose I provide, as it were, a leak from each cushion to the exhaust, and I adjust this leak by a valve. A small hole or port, $e$, is drilled through each end of the cylinder, intersecting the port $a$ and penetrating the port $b$, so that a small passage is provided from $a$ to $b$. This permits the steam confined in the cushion to escape through $a$ and $e$ into $b$, and thence to the exhaust. Each leak-port $e$ is provided with a valve, I, constructed similarly to an ordinary globe-valve, by screwing up the wheel of which the end of the stem is caused to enter and choke the port $e$ more or less, or to close it entirely. Thus the steam-cushion is adjustable to any desired resistance.

I have now described how the engines are operated from their valves, it being understood that both engines are identical in construction and operation. It only remains now for me to describe how the valves are operated. Each valve D D' consists of a tubular stem, $f$, having a thick piston, $c$, on each end and a piston, $g$, formed on its middle. Grooves $h\ h$ are also cut in the stem $f$ about midway between the piston $g$ and the pistons $c\ c$. Each valve-chest C C' is made up, for convenience in construction, of a middle casting, J, and two end castings, K K. Interiorly it consists of a longitudinal bore fitting the stem $f$, of two end chambers, H H, containing the pistons $c\ c$, and a middle cylindrical valve-piston chamber, L, fitting the piston $g$. The piston $g$ is preferably made in one piece with the stem $f$, and the pistons $c\ c$ are made separately and screwed on.

In putting the parts together the casting J is bolted to one of the castings K, the piston $g$ is placed in the cylinder L in the casting J, and the stem $f$ thrust into the casting K. The other casting, K, is then bolted on and the pistons $c\ c$ are screwed onto the ends of the stem. The valve D and valve-chest C are then complete. The valve D' and chest C' being likewise put together, the two valve-chests are connected by the bridge E being bolted between them, and the whole is then bolted down on top of the two steam-cylinders. Caps $r\ r$ are screwed into the left-hand ends of the valve-chests, and the steam-pipes are joined to their right-hand ends by couplings $s\ s$. A comprehension of the steam-passages will be facilitated by reference to Fig. 9, in connection with the other figures.

Referring first to Figs. 3 and 9, the steam-cylinder A is provided with a small steam-passage, $i$, and the cylinder A' with a passage, $i'$. Each passage $i$ or $i'$ leads from the middle of its cylinder, (see Fig. 3,) extends laterally, then upwardly, and thence into the middle of the valve-chest beneath the center thereof. From this point it branches and extends in both directions longitudinally, (see Fig. 2,) and then both branches ascend to the bore for the valve-stem, where they terminate. Just opposite the termination of the two branches of the passage $i$ two other passages, $j$ and $k$, originate, as seen in Figs. 1 and 9. These passages (see Fig. 1) approach each other, and extend, side by side, through the bridge E, Fig. 4, to the opposite valve-chest, C', where they enter the valve-piston chamber L' near its opposite ends, leaving a cushioning-space beyond them at its ends. From the passage $j$ a branch, $j'$, extends around the end of the chamber L, and enters its end, being provided with a check-valve, $v$, (not shown in Fig. 9,) which is indicated in Fig. 1 and shown in detail in Fig. 8. The passage $k$ has a like branch, $k'$, entering the opposite end of the chamber L', and provided also with a check-valve, $v$.

In the valve-chest C', opposite the terminations of the two branches of the passage $i'$, (see Fig. 9,) two passages, $m$ and $n$, originate, and, crossing each other, extend to the valve-piston chamber L, which they enter near its ends, and have branches $m'$ and $n'$, which enter the ends of the chamber, and contain check-valves $v$. The passage $m$ is shown best in Fig. 5. It extends upward and then to the left until it reaches the middle, passes through the bridge E, over the passages $j$ $k$, (see Fig. 4,) and in the valve-chest C it extends to the left and down. The passage $n$ is best shown in Fig. 6. In the valve-seat C' it extends downward and to the right until it reaches the middle. It then passes through the bridge E, (see Fig. 4,) under the passages $j$ $k$, and in the valve-chest C it extends to the right and then downward to the chamber L.

In the valve-chest C an exhaust branch passage, $l$, leads from the passage $j$, extends to the right, and terminates in the bore for the valve-stem $f$. (See Figs. 1 and 9.) Another branch, $l'$, leads from the passage $k$ to the left, and terminates in the bore. Immediately opposite the termination of these branches are two exhaust-passages, $p$ and $p'$, (see Figs. 2 and 9,) which extend from the valve-stem bore to the exhaust-passage $d$. The several passages in the valve-chest C are so spaced where they enter the valve-stem bore relatively to the width of the grooves $h$ $h$ and the stroke of the valve that when the valve is moved to the right the right-hand groove $h$ connects together the exhaust-passages $l$ and $p$, while the stem $f$ covers and closes the passages $j$ and $i$, and the left-hand groove $h$ connects the passages $i$ and $k$, while the stem $f$ covers the passages $l'$ and $p'$. When the valve stands at the left, the opposite result is effected. The passages and valve in the valve-chest C' are arranged in precisely similar manner. The exhaust-branches corresponding to $l$ and $l'$ are here lettered $o$ and $o'$, and those corresponding to $p$ and $p'$ are lettered $q$ and $q'$.

The operation may best be understood by reference to Fig. 9, where all the ports and passages are shown in one view. The piston B' is here moving toward the right, and has passed and uncovered the steam-passage $i'$. Steam is consequently passing from the cylinder A' through this passage $i'$ and (its right-hand end being closed by the valve-stem $f$) through its left-hand branch, with which the groove $h$ coincides, around through this groove to the passage $n$, and through this to the valve-piston chamber L, where it is pressing on the piston $g$ and moving the valve D to the left.

The steam on the other side of piston $g$ escapes through the passage $m$ and branch $o$, passes around the right-hand groove $h$ in the valve D', and flows through the passage $q$ to the exhaust. The movement of the valve D is in reality instantaneous; but it is here shown in the act of moving, having moved just far enough to uncover the right-hand port $a$ and the left-hand port $b$ of the cylinder A; consequently the piston B, which has been at rest, is just starting on its leftward stroke. Both pistons move together and in opposite directions for a moment, until the piston B' reaches the end of its stroke and stops. By this time the piston B is at full speed and the valve D is moved fully to the left. As soon as the piston B passes the passage $i$, the steam from the cylinder A flows through this passage, through its right-hand branch, around the right-hand groove $h$, through the passage $j$ and branch $j'$, (opening the check-valve $v$,) and into the chamber L', forcing the piston $g$ and valve D' to the left. Meanwhile the steam on the left of the piston $g$ escapes through the passage $k$, the branch $l'$, the left-hand groove, $h$, of the valve D, and the passage $p'$ to the exhaust. When the valve D' has been thus shifted, it will uncover the right-hand port, $a$, and the left-hand port, $b$, of the cylinder A', and the piston B' will be driven to the left. Meanwhile the piston B will stop at the left of its stroke, with the valves D D' in the position shown in Figs. 5 and 6. When the piston B' passes the middle of the cylinder, it uncovers passage $i'$, and steam flows through $i'$, $m$, and $m'$ into chamber L and shifts valve D to the right, the exhaust-steam escaping from L through $n$, $o'$, and $q'$. The piston B is then driven to the right, the piston B' meanwhile reaching the left of its stroke and stopping. When B uncovers $i$, steam flows from A through $i$, $k$, and $k'$, and shifts valve D' to the right, the exhaust escaping through $j$, $l$, and $p$. The piston B' then starts to the right, and the piston B stops at the completion of its stroke at the right. The parts are now again in the position shown in Fig. 9, having passed through a complete cycle of operations. Thus it is seen that each valve is driven by a piston, $g$, formed on it, whose movement is produced by steam which is taken from the cylinder of the other engine, and the flow of which is controlled by the valve and piston of the other engine. Thus each valve controls not only the movement of its own piston, but also, through its grooves $h$ $h$, contributes to the control of the other valve, and each piston B B' acts also as a valve to determine the admission of steam to shift the valve of the other engine. The perfect reciprocal action of the two engines is thus assured, without any extraneous valve mechanism whatever, and with only two moving parts (the valves D and D') in addition to the pistons. By means of the construction which I have adopted, the formation of the several ports and steam-passages is rendered very easy and cheap, the exhaust-passages $d$ $d'$ and the steam-passages in the bridge E being preferably cored out, and the small steam-passages and ports in the passages J and K K being preferably drilled.

My improved engine is thus cheaply constructed, and there is practically nothing about it to wear out or get out of order. The parts are readily detached in case of necessity, there being but few bolts and joints.

One very important feature of my invention I have not yet described. The steam-passages $i$ and $i'$ are each fitted with a valve, M. (Shown best in Fig. 3.) The valves M M are constructed the same as globe-valves, except that the side of the steam-cylinder is substituted for the globular chamber of a globe-valve. By screwing their stems in or out, the passages $i$ and $i'$ may be more or less closed or choked, so that more or less pressure of steam may be admitted to work the valves D D'. When the engine is running under steam at a high pressure, it is desirable to contract the passages $i$ $i'$, and so reduce the pressure of the steam which acts on the valves, as otherwise they would be shifted too violently and with too great suddenness. As the valves are perfectly balanced and have no load whatever, they are moved with the greatest ease, and a very slight steam-pressure is sufficient.

In addition to adjusting the capacity of the passages $i$ $i'$ for different steam-pressures, the valves M M have also another function of great practical importance. By their means the rapidity with which the valves D D' shall shift can be regulated to a nicety, with the result of determining the promptness with which one steam-piston shall follow the other in its movement. Thus in pumping water under heavy pressure, as in forcing it to a considerable height, it is desirable that the pump-plungers shall pause at each end of their stroke, in order to give the water-valves ample time to seat themselves before the return-stroke begins, as otherwise the back-pressure of the water would cause a back-flow into the pump-cylinders and greatly impair the efficiency of the pump. For such service the valves M M should be nearly closed, thus choking the passages $i$ $i'$ to such an extent that the flow of steam through them is retarded, and the valves D D' are shifted slowly—in fact, so slowly that each piston, after it stops, remains at rest until the other is almost completing its stroke, so that only one piston is moving at a time, except at the ends of the stroke, when one is starting while the other is stopping; but in pumping water at light pressure, as in transferring water from one tank to another on the same level, where there is no such tendency to back-flow, the steam-passages $i$ $i'$ may be left fully or nearly open, in which case the valve of each engine will shift instantly when the piston of the other engine passes mid-stroke and uncovers the passage $i$ or $i'$, thus causing the pistons to stop and start back with scarcely any intervening pause. Thus, by the simple expedient of adjusting the valves M M, the engine may be readily adapted to any service required. The valve-pistons $g$ $g$ are cushioned, in order that they shall stop without jar or hammering. As before described, the ports or passages $j$, $k$, $m$, and $n$ enter the chambers L and L', and a little back from the ends of the latter, thus leaving cushioning-spaces beyond them. The branch passages $j'$, $k'$, $m'$, and $n'$ only admit steam to enter these cushioning-spaces to start the pistons $g$ $g$ back, the steam being kept from escaping from the cushions through their branches by means of the check-valves $v$ $v$ in the latter. These valves need not be tight, but should retard the steam long enough to make it serve as a cushion, and may permit it eventually to escape, so that the pistons $g$ $g$ can move to the extreme ends of the chambers L L'. These valves $v$ $v$ are very simple, as shown in Fig. 8, consisting merely of a strip of sheet metal confined by a screw. They are arranged in recesses milled out in the opposite ends of the castings J J, as indicated in Fig. 7. These valves $v$ $v$ are not shown in Fig. 9, and the valves I I and M M are there denoted as though they were stop-cocks. Stop-cocks might of course be substituted for the form of valves shown, or any other means of adjustably choking the passages $e$ $e$, $i$, and $i'$ might be adopted.

The valves D D' are for simplicity shown in Fig. 9 as being solid instead of tubular, with steam-pipes F F connecting with both ends of the valve-chambers C C'.

The features of my invention shown in Fig. 9 are the most essential, it being obvious that the constructions of the various parts in the manufacture of the engine might be greatly modified without materially affecting its operation.

My improved engine is adapted to be driven by any fluid-pressure—as by compressed air or by water—instead of steam.

The dotted lines $x$ $x'$ in Fig. 9 illustrate a modification by means of which the valves M M might possibly be dispensed with. In case the engine is intended to do one uniform service under considerable load and with a nearly uniform steam-pressure, there might be two passages, $i$, instead of one passage divided into two branches. These passages would cross each other in different planes, and would enter the cylinder A on opposite sides of its middle, as shown in dotted lines. The piston B, in moving from right to left, would first uncover the passage $x'$, but no steam would enter it, because its other end is closed by the stem $f$; but when the piston uncovered passage $x$ steam would enter it and shift the valve D' just as the piston B was finishing its stroke. Cylinder A' would of course have two like crossed passages in place of its passage $i'$.

I am aware that, broadly speaking, duplex engines having steam-actuated valves and steam-passages crossing from each engine to the other are not new; but, so far as I am aware, mine is the first duplex engine having steam-actuated valves wherein the valve of each engine is operated directly by steam taken from the cylinder of the other engine, whereby all intermediate valves are dispensed with and the only essential moving parts are the two valves—one for each engine.

I claim as my invention—

1. A duplex steam-engine consisting of the combination, with the cylinder and piston of each engine, of a single steam-actuated valve for each engine, and with steam-passages leading from the cylinder of each engine across to the valve-chest of the other engine, arranged and operating substantially as set forth, whereby the valve of each engine is actuated directly by steam taken from the cylinder of the other engine.

2. The combination of two steam-cylinders, two inclosed steam-actuated valves, steam-passages extending each from the cylinder of one engine to the valve of the other, and exhaust-passages extending each from the valve of one engine through the valve of the other to the exhaust-passage from the cylinder, substantially as set forth.

3. The combination of two steam-engines having inclosed steam-actuated valves, with steam-passages, each extending from the cylinder of one engine through the valve of that engine to the valve-piston chamber of the other engine, in order to shift the valve of the latter, and exhaust-passages leading from each valve-piston chamber to the exhaust, substantially as set forth.

4. The combination of two steam-engines having inclosed steam-actuated valves, with steam-passages, each leading from the cylinder of one engine through the valve of that engine to the valve-chest of the other engine, in order to shift the valve to the latter, and exhaust-passages, each leading from the valve-chest of one engine through the valve of the other engine to the exhaust, substantially as set forth.

5. In a steam-engine having a steam-actuated valve, the combination therewith of a steam-passage leading from the cylinder to the valve-piston chamber to shift the valve, and a valve adapted to close or choke the said passage to greater or less extent, as and for the purposes set forth.

6. The combination of two steam-engines having steam-actuated valves, with steam-passages, each leading from the cylinder of one engine to the valve-chest of the other, in order to shift the valve of the latter, and with valves in said passages adapted to close or choke them more or less, and thereby regulate the rapidity of shifting of the engine-valves, substantially as set forth.

7. The combination of two steam-engines, their steam-actuated valves D D′, each formed with a piston, $g$, and grooves $h\ h$, with valve-chests C C′, formed with chambers L and L′, and with steam-passages $i$, $i'$, $j$, $k$, $m$, and $n$, and exhaust-passages $l$, $l'$, $o$, and $o'$, all combined and arranged to operate substantially as set forth.

8. The combination, with cylinders A A′, of valve-chests C C′, each consisting of two end pieces, K K, and a middle piece, J, a bridge-piece, E, connecting the two middle pieces J J, and the inclosed valves D D′, all constructed substantially as set forth.

9. The combination, with a cylinder, A, of steam-ports $a\ a$ at its opposite ends, exhaust-ports $b\ b$ near its opposite ends, leak-ports $e\ e$, valves I I, valve D, having valve-pistons $c\ c$, and valve-chest C, substantially as set forth.

10. The combination of two steam-engines having steam-actuated valves, provided with pistons inclosed in chambers L L′, steam-passages, each extending from the cylinder of one engine to the chamber L or L′ of the other, and entering said chambers near the ends thereof, and with branch passages entering said chambers at their ends, and containing cushioning check-valves $v\ v$, substantially as set forth.

In witness whereof I have hereunto signed my name in the presence of two subscribing witnesses.

MILAN W. HALL.

Witnesses:
A. E. HALL,
ARTHUR C. FRASER.